UNITED STATES PATENT OFFICE.

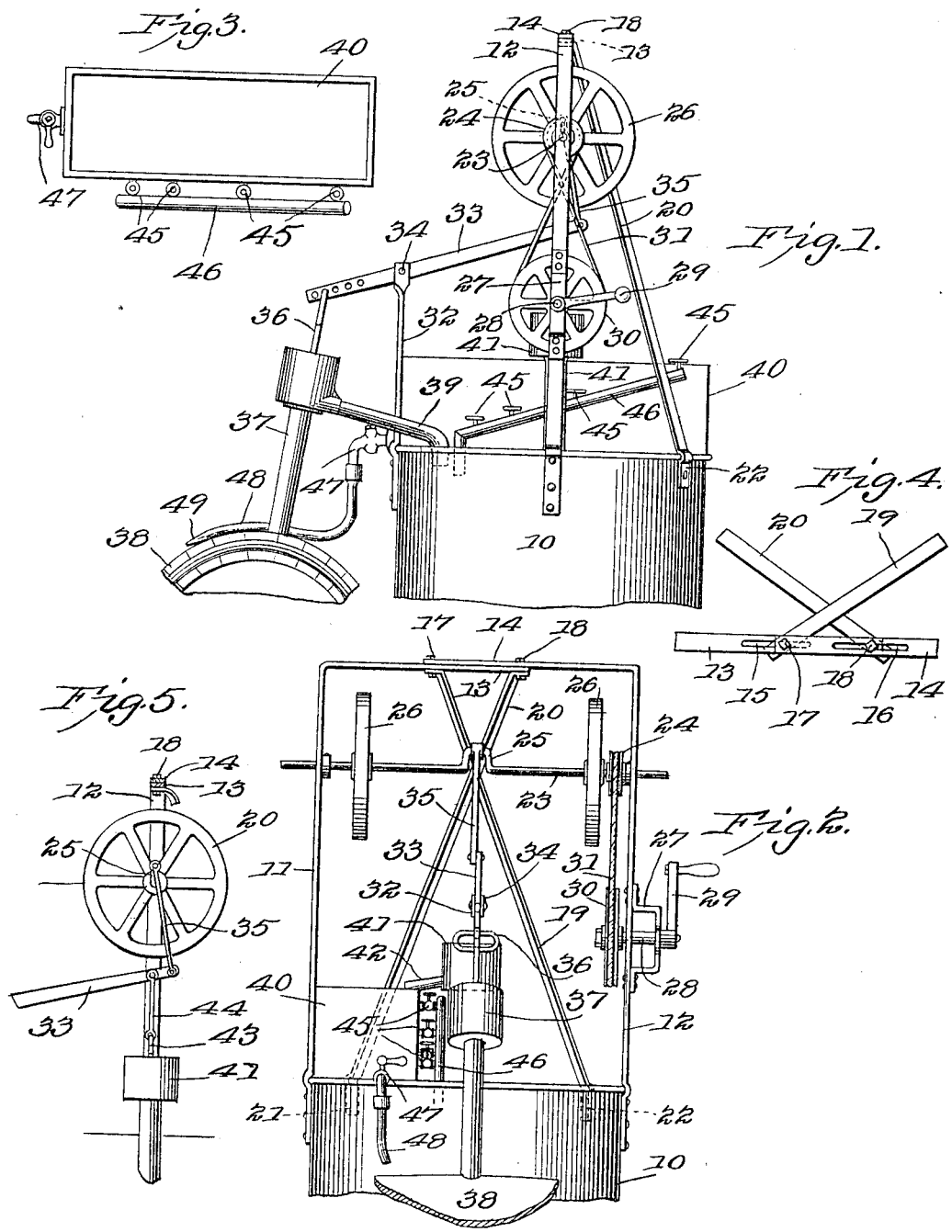

JAMES HALL SHERRARD, OF SPARTA, ILLINOIS.

TANK-PUMP AND LIQUID-MEASURE.

No. 819,088.  Specification of Letters Patent.  Patented May 1, 1906.

Application filed July 24, 1905. Serial No. 271,078.

*To all whom it may concern:*

Be it known that I, JAMES HALL SHERRARD, a citizen of the United States, residing at Sparta, in the county of Randolph and State of Illinois, have invented a new and useful Tank-Pump and Liquid-Measure, of which the following is a specification.

This invention relates to devices for storing, measuring, and dispensing liquids, and has for its object to improve the construction and increase the efficiency and utility of devices of this class.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings thus employed, Figure 1 is a side elevation, and Fig. 2 is a front elevation, of the improved apparatus. Fig. 3 is a plan view of the combined measuring and dispensing can. Fig. 4 is a detail view of the frame adjustment. Fig. 5 is a detail view of a part of the pump-operating mechanism.

The improved apparatus comprises a storage-tank 10 of any required form or material and provided with standards 11 12, extending upwardly from opposite sides of the same and with their upper portions extending inwardly and overlapping, as at 13 14, above the tank, the overlapping portions being slotted, as at 15 16, and coupled by clamp-bolts 17 18, so that the frame members may be readily adjusted for tanks of varying widths. The frame is further supported by brace members 19 20, connected between the clamp-bolts 17 18 and the sides of the tank to which the braces are connected at their lower ends, as at 21 22. Journaled in the standards 11 12 is a shaft 23, having a belt-pinion 24, a crank 25, and preferably with fly-wheels 26. Journaled in a bracket-frame 27 on the standard 12 is a drive-shaft 28, having a crank 29 and belt-pulley 30, the latter designed to operate the shaft 23 through the medium of a belt 31, preferably crossed to increase the grip upon the pinion. Rising from the tank 10 at one side is a standard 32, to whose upper end a "walking-beam" member 33 is pivoted, as at 34, with a connecting-rod 35 coupled between one end of the member 33 and the crank 25, while the opposite end of the member 33 is coupled to the plunger 36 of a pump, (indicated at 37.) The pump 37 is designed to transfer the liquid from a barrel (indicated at 38) or other source of supply to the tank through a spout 39. By this simple arrangement it will be obvious that the pump will be rapidly operated by the rotation of the crank 29 and transfer the liquid from the source of supply to the tank.

Disposed upon the tank 10 is a combined receiving, measuring, and dispensing can or receptacle 40 of any required size, but preferably large enough to hold the largest amount of liquid which it is designed to dispense. A pump 41 is disposed in the tank 10 with its discharge-spout 42 extending over the receptacle 40 and with its plunger 43 for coupling to the member 33 by a rod 44, as in Fig. 5. When the pump 37 is being operated, the rod 44 will preferably be disconnected, and when the pump 41 is being operated the rod 36 will be disconnected. Connected to the receptacle 40 are a plurality of overflow-valves 45, spaced from the bottom of the receptacle at distances corresponding to the various quantities of liquid it is designed to dispense. For instance, the lowest of the valves 45 is located at a point level with the height which the smallest quantity to be dispensed reaches in the receptacle, say one quart, and the second valve located to correspond in like manner to the next quantity, say two quarts or one-half gallon, and in like manner for one gallon, five gallons, and so on for any required quantity. The overflow-valves are arranged to lead into one common drainage-tube 46 to conduct the overflow back into the tank 10. The receptacle 40 is also provided with a draw-off valve 47, from which a flexible tube 48 leads and terminates in a nozzle-like member 49 for fitting into the intake end of a can, jug, or other receiving vessel. By this means any desired quantity of the liquid may be measured into and dispensed from the single receiving vessel 40 within the range of the overflow-valves. For instance, suppose it is desired to measure and dispense one quart. The valve 47 is closed and the lowermost valve 45 or the one corresponding to one quart is opened, and as the area of the receptacle 40 below the lower overflow-valve is equal to one quart one quart only will be retained in the receptacle, the surplus, if any there be, flowing back to the tank 10. When the liquid has settled to the height of the lowest overflow-valve, it can be drawn off through the valve 47. If one gallon of liquid is required, the overflow-valve at the gallon-line is opened, and all the overflow-valves below the gallon-valve, together with the draw-off valve, are closed and the pump 41 operated as before; but it will be obvious that one gallon only will remain in the receptacle, the surplus flowing back to the tank. The same action will take place for any quantity required.

The apparatus is designed more particularly for storing, measuring, and dispensing kerosene-oil and like products in retail stores; but the device can be readily adapted for other liquids, as will be obvious. The apparatus can be of any required size or of any required material.

Having thus described the invention, what is claimed is—

1. In an apparatus of the class described, a source of supply, a receiver for the liquid to be dispensed, means for conducting the liquid from the source of supply to the receiver, means for discharging the liquid from said receiver, a conductor disposed at an angle to said receiver and discharging into the source of supply, a plurality of branch pipes spaced apart and leading laterally from said conductor and connected into said receptacle at certain predetermined heights, and a controlling-valve in each of said branches.

2. In an apparatus of the class described, a supply-tank, spaced standards attached to said tank and extended inwardly above the same with their ends overlapping, means for adjustably coupling said overlapping ends, a shaft journaled in said standards and provided with a crank, a receiver for the liquid to be measured and dispensed, a pump supported in said tank with its discharge above said receiver, connecting means between said shaft-crank and the plunger of said pump, means for rotating said shaft, overflow-valves connected to said receiver at points corresponding to the height which the various quantities of liquids which are to be measured and dispensed will rise therein, means for conducting the surplus liquid flowing through said valves back to the tank, and a draw-off valve connected to said receiver.

In testimony that I claim the foregoing as my own I have hereto affixed my signature in the presence of two witnesses.

JAMES HALL SHERRARD.

Witnesses:
GEO. H. CHAMBERS,
J. R. ALEXANDER.